United States Patent
Wilhelmi

[15] 3,639,895
[45] Feb. 1, 1972

[54] VEHICLE BRAKE LINING WEAR WARNING DEVICE

[72] Inventor: Heiner Wilhelmi, Hamburg, Germany
[73] Assignee: Jurid Werke GmbH, Reinbek, Postfach, Germany
[22] Filed: June 2, 1970
[21] Appl. No.: 42,718

[30] Foreign Application Priority Data
June 3, 1969 Germany ................P 19 28 215.6

[52] U.S. Cl. .........................340/52 A, 200/61.44
[51] Int. Cl. .....................................G08b 21/00
[58] Field of Search ..........340/52 A, 52 B; 200/61.4, 61.42, 200/61.44

[56] References Cited
UNITED STATES PATENTS
3,456,236  7/1969  Labartino et al...................340/52 A
3,372,372  3/1968  Carpenter et al. ................340/262 X

*Primary Examiner*—Alvin H. Waring
*Attorney*—Young & Thompson

[57] ABSTRACT

A signal generating means in an electric circuit cooperates with the friction linings of an automotive vehicle warning signal in case that the wear of the friction linings has reached a minimum limit.

6 Claims, 5 Drawing Figures

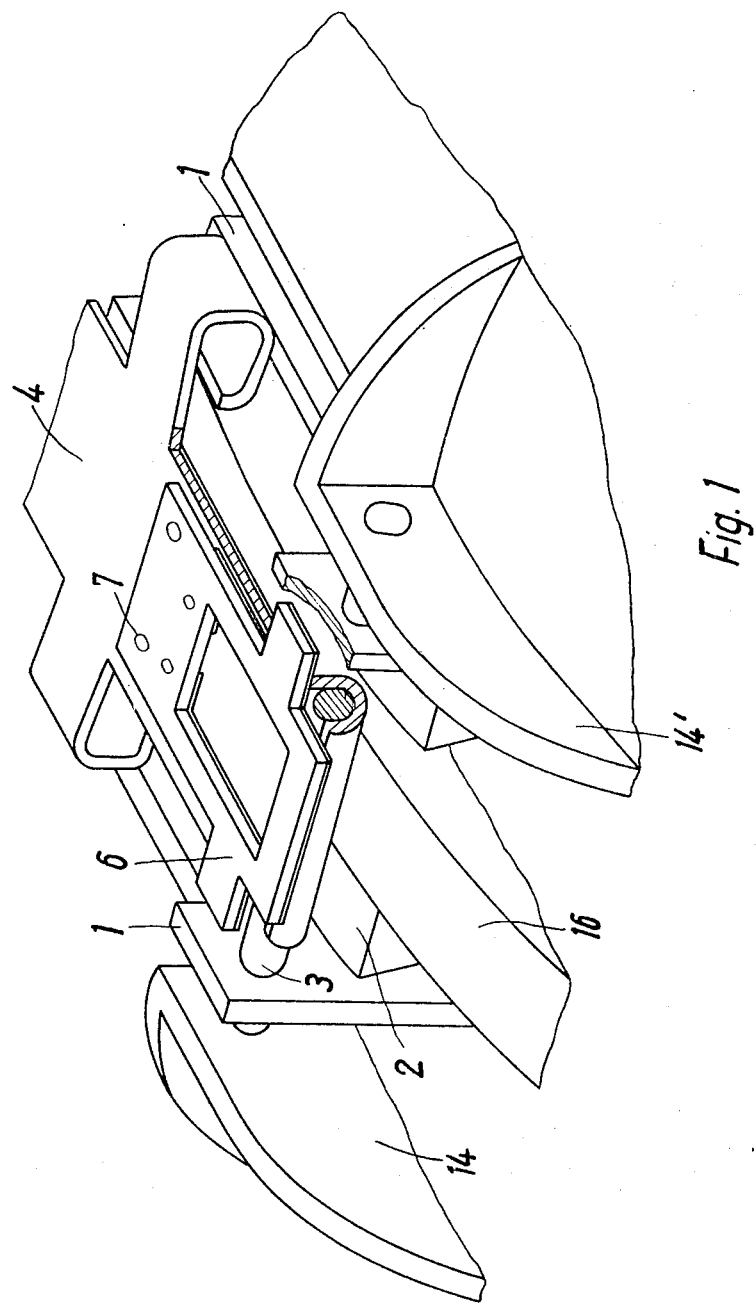

VEHICLE BRAKE LINING WEAR WARNING DEVICE

The invention relates to a warning device for indicating that the friction linings in brakes are worn as far as permissible, comprising a switch means which is contained in an electrical circuit also containing an indicating means, and which automatically responds when the wear of the linings has reached the permissible limit.

The design of hitherto conventional warning devices of this kind is based on the provision of two contacts in an electrical circuit making contact when the prescribed limit of permissible wear has been reached, and thereby energizing an indicating device, such as a lamp, likewise contained in the circuit. One of the contacts is frequently embedded in the friction lining or affixed to the member which carries the lining, the contact touching the surface with which the lining cooperates and thereby closing the circuit when the lining is worn.

Such devices are open to many objections and their shortcomings are such that a reliable performance of their warning function is open to considerable doubt.

The contacts may oxidize, become fouled or iced. Earth contact of the moving cooperating surface, such as of the brake drum or disc, may be interrupted. Connecting cables may break without this having been noticed. Since such a warning device is not required to function very often, there is always room for doubt whether it will function at all when the need actually arises. Moreover, contacts embedded in the friction lining may suddenly affect the coefficient of friction when they are uncovered and thus reduce the efficiency of the brake.

The above-mentioned defects are substantially eliminated in a warning device according to the invention in which the switch means is a frangible element which mechanically cooperates with the shoes carrying the friction lining, and which is fractures because of the additional movement required towards the cooperating surface when wear of the lining has reached the permissible limit. In a manner resembling the functioning of a fuse the fracture of the frangible element interrupts an electric circuit. In a very simple circuit arrangement the destruction of the frangible element may for instance cause an indicating lamp to go out. Such a circuit has the advantage of always being functionally controllable in the same way as for instance the oil pressure of the engine by the oil pressure indicating lamp.

However, with minor additions the method of indication can be advantageously modified in various ways. Preferably the frangible element is contained in a circuit parallel to that containing indicating means, such as an indicating lamp. Conveniently the indicating device may be so designed that when the plant with which the device is associated is switched on, potential is also applied to the warning device. In the case of a motor vehicle powered by an Otto cycle engine this means that the warning device is also energized when the ignition is switched on. Three operative states can then be distinguished:

1. The lamp fails to burn when the device is switched on. This indicates that the lamp is faulty or that there is a fault in the circuit.
2. The lamp glows; this indicates that the warning device is in proper working order.
3. The lamp burns brightly. This means either that the frangible element has been broken and that the lining is worn or that the electrical connections to the fracturing element are broken.

Alternative methods of connecting the frangible element consists in connecting the same to a relay which is released when the frangible element is destroyed, release of the relay causing signals to be given or the plant to be stopped. The frangible element preferably consists of a brittle insulting material, such as a ceramic or hard paper having a conducting element attached thereto for instance by electrodeposition, soldering, an adhesive, vaporization or printing. The frangible element may have points of weakness at which it will fracture first to interrupt the electrical circuit. The frangible element may with advantage be affixed to the caliper of the brake and located between the shoes carrying the friction linings. It can be affixed to existing forms of brakes without much difficulty.

The invention is not limited to use with a particular type of brake.

Other advantages and features of the invention will be understood from the following particular description of a preferred embodiment of the invention with reference to the accompanying drawing in which:

FIG. 1 is a simplified perspective drawing of part of a shoe-type disc brake comprising a caliper which is open in the radial direction of the disc, and of the device according to the invention;

Figures 1A, 2, 3:
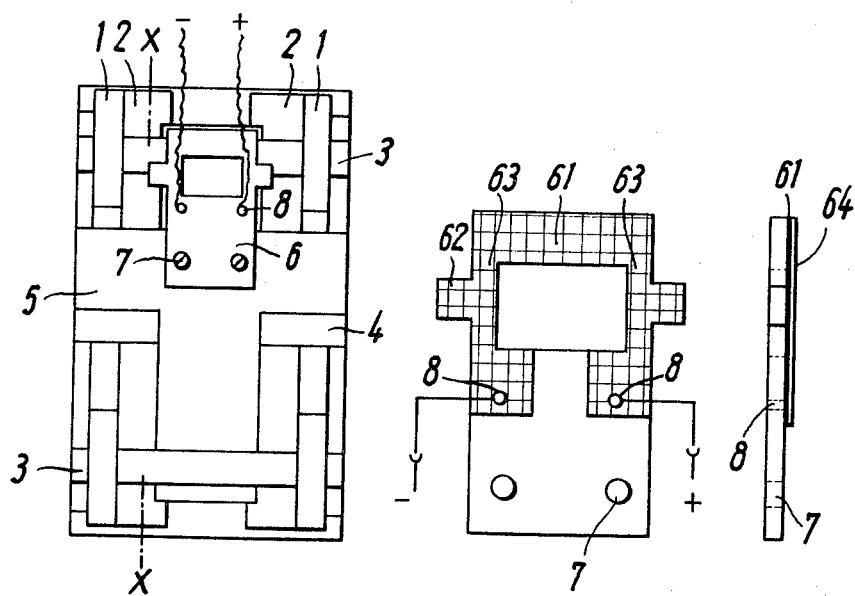
FIG. 1a is a simplified view of the arrangement of FIG. 1 from above.
FIGS. 2 and 3 are an embodiment of the frangible element in plan and in view from the side, of the device of FIG. 1.

In the perspective drawing of FIG. 1 and in FIG. 1a which is a view in the radial direction from outside the brake disc, there can be seen a shoe provided with a friction lining 2 guided on pins 3 and adapted to be depressed and urged apart by a cruciform spring 4. Above this cruciform spring and partly covering the same is a holder 5 for a frangible element 6, as shown in FIG. 1a. The holder 5 and the spring 4 are simply clipped under the pin 3. Alternatively as shown in FIG. 1, the frangible element 6 may be attached directly to the spring 4.

In FIG. 1a the frangible element 6 is attached to the holder by screws 7. Terminals 8 on a conducting part 61 of the frangible element 6 serve for connecting the frangible element 6 to corresponding terminals of an electrical circuit shown in FIG. 4.

The fracturing element 6 and its conducting part 61, of FIG. 2 and 3, may be a mass-produced article made of a hard paper insulating material of the kind used for printed circuits.

Figure 4:
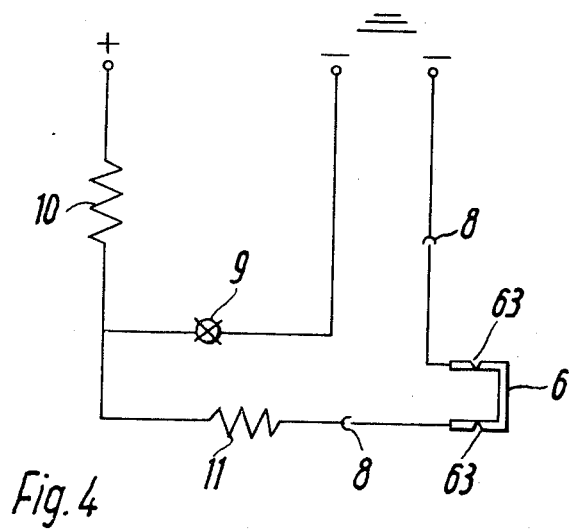
FIG. 4 shows a circuit for the device of FIG. 1.

FIG. 1 also shows the two parts 14, 14', of a caliper on each side of a brake disc 16. The frangible element 6 is so fitted to the caliper 14, 14', that the shoes carrying the lining will make contact with projections 62 of the frangible element in the region of the conducting part 61 when the friction lining 2 has worn down to the residual thickness still just considered safe. The safe minimum thickness of the lining is indicated by a dot-dash line marked "X" in FIG. 1a. If the linings 2 are further worn the frangible element will be so compressed by the shoes 1 bearing against the projections 62 of the frangible element 6 that the latter breaks. This process of destruction which also interrupts the electrical circuit as indicated in FIG. 4 can be controlled by weakening the surface of the conducting part 61 of the frangible element 6 at particular points 63 where fracture will then first take place. The frangible element is also provided with a coating 64 which protects the conducting layer 61 from destruction by dirt or the like.

A preferred circuit arrangement for the proposed warning device comprising the frangible element 6 is illustrated in FIG. 4 An indicating lamp 9 in series with a resistor 10 is connected to the positive terminal (+) of a battery for instance via the ignition switch in a motor vehicle powered by an Otto cycle engine. The resistance of the lamp 9 and the resistor 10 are so matched that the lamp will shine brightly when only that part of the circuit which contains the lamp 9 and the resistor 10 are connected to the battery.

A second resistor 11 and the frangible element 6 are in a branch circuit parallel to the incandescent lamp 9 and current will flow through this branch when potential is applied to the warning device and the frangible element 6 is intact. In such case the current flowing through the branch containing the incandescent lamp 9 will be only weak and the lamp 9 will do no more than glow, but it will not shine brightly. When the brake linings 2 have worn down to the permissible limit (line X—X) the frangible element 6 breaks. Consequently the branch circuit which divides off from the lamp circuit between the resistor 10 and the lamp 9, and which contains the resistor 11 and the frangible element 6, will be disconnected. Hence the lamp 9 will light up and shine brightly, warning the driver of the vehicle fitted with the warning device that the brake linings 2 are worn and require replacement.

What we claim is:

1. A warning device for indicating that the friction linings in a brake have been worn down as far as is permissible, comprising a switch means which is contained in an electrical circuit also containing a voltage source and an indicating device, and which automatically responds when wear of the linings has reached the permissible limit, in which the switch means is a frangible element which is located in the brake outside of the friction lining at a distance from a cooperating part which participates in the motions of the friction lining relative to the frangible element, said distance being equal to the difference between the thickness of the unworn lining and the permissible residual thickness of the lining when worn.

2. A device according to claim 1, in which the frangible element is contained in a branch of the circuit parallel to that containing the indicating means.

3. A device according to claim k, in which the frangible element consists of a brittle insulting material carrying a conductor.

4. A device according to claim 1, in which the frangible element is provided in the surface region of the conductor with weakened areas which will fracture first.

5. A warning device as claimed in claim 1, in which the frangible element is provided with weakened areas which will fracture first.

6. In an automotive vehicle having a brake comprising a brake member and replaceable friction lining movable toward and away from the brake member to brake and release the brake member, the brake including permanent members outside said friction lining that move relative to each other upon movement of said friction lining; the improvement comprising a warning device for indicating that the friction lining has been worn down as far as is permissible, comprising in circuit a voltage source and an indicator and a conductive frangible element which is located outside the friction lining, said permanent members being movable a relatively small distance during permissible wear of said friction lining and a greater distance when the wear on the friction lining exceeds that which is permissible, said permanent members upon movement through said greater distance exerting on said frangible element a force greater than the forece said frangible element can withstand and which ruptures said frangible element to interrupt said circuit and to cause said indicator to indicate excessive friction lining wear.

* * * * *